(12) United States Patent
O'Brien (10) Patent No.: US 11,645,956 B2
(45) Date of Patent: May 9, 2023

(54) SAFETY LIGHT ASSEMBLY (71) Applicant: Mark Kevin O'Brien, Tuckahoe, NY (US)

(72) Inventor: Mark Kevin O'Brien, Tuckahoe, NY (US)

(73) Assignee: Mark O'Brien, Tuckahoe, NY (US)

( * ) Notice: Subject to any disclaimer, the term of this patent is extended or adjusted under 35 U.S.C. 154(b) by 0 days.

(21) Appl. No.: 17/648,603

(22) Filed: Jan. 21, 2022

(65) Prior Publication Data

US 2022/0230566 A1 Jul. 21, 2022

Related U.S. Application Data

(60) Provisional application No. 63/139,926, filed on Jan. 21, 2021.

(51) Int. Cl.
| | |
|---|---|
| *G09F 13/16* | (2006.01) |
| *G09F 13/02* | (2006.01) |
| *G09F 13/04* | (2006.01) |
| *G09F 13/22* | (2006.01) |
| *B60Q 1/26* | (2006.01) |

(52) U.S. Cl.
CPC ........... *G09F 13/16* (2013.01); *B60Q 1/2615* (2013.01); *B60Q 1/2657* (2013.01); *G09F 13/02* (2013.01); *G09F 13/0472* (2021.05); *G09F 13/22* (2013.01)

(58) Field of Classification Search
CPC .... B60Q 1/2615; B60Q 1/2696; B60Q 1/301; G09F 13/02; G09F 13/16; G09F 13/165; F21Y 2107/30; F21Y 2103/33; F21V 21/0965
See application file for complete search history.

(56) References Cited

U.S. PATENT DOCUMENTS

| | | | | |
|---|---|---|---|---|
| 1,263,072 A | * | 4/1918 | Klink ...................... | G09F 13/16 |
| | | | | 116/63 P |
| 5,440,464 A | * | 8/1995 | Nowlin ................... | G09F 13/02 |
| | | | | 340/908 |
| 5,755,051 A | * | 5/1998 | Zumbuhl ................ | G09F 21/02 |
| | | | | 40/607.04 |
| 9,046,229 B2 | * | 6/2015 | Bennett ..................... | F21L 4/08 |
| 9,286,815 B1 | * | 3/2016 | Smith ................. | G09F 15/0056 |
| 9,305,472 B1 | * | 4/2016 | Pitts ........................ | G09F 13/22 |
| 10,976,046 B2 | * | 4/2021 | Dir ............................ | F21L 4/02 |
| 11,158,217 B2 | * | 10/2021 | Evans ................. | G09F 15/0056 |
| 11,397,002 B2 | * | 7/2022 | Dir ........................... | F21V 23/005 |
| 2017/0086282 A1 | * | 3/2017 | Smeltzer ............... | B60Q 1/2615 |
| 2017/0365136 A1 | * | 12/2017 | Torre Sarmiento ....... | F21K 9/68 |
| 2020/0143717 A1 | * | 5/2020 | Evans ..................... | G09F 21/02 |
| 2020/0217496 A1 | * | 7/2020 | Dir ......................... | F21V 7/0008 |
| 2021/0190306 A1 | * | 6/2021 | Dir ........................... | F21V 23/04 |

* cited by examiner

*Primary Examiner* — Alexander K Garlen (57) ABSTRACT

A safety lighting assembly enabled to cast light rearward toward the surface to which it is attached. The safety light assembly provides additional portions for emitting light in selected directions so as to facilitate situation awareness of the object.

4 Claims, 8 Drawing Sheets

SAFETY LIGHT ASSEMBLY

CROSS-REFERENCE TO RELATED APPLICATION

This application claims the benefit of priority of U.S. provisional application No. 63/139,926, U.S. provisional application number filed 21 Jan. 2021, the contents of which are herein incorporated by reference.

BACKGROUND OF THE INVENTION

The present invention relates to safety light assemblies and, more particularly, a light assembly adapted project light in multiple desired directions, and wherein the light assembly is configured to removably attach to objects to improve their visibility as well as the visibility of the surrounding area.

Current lights on a school bus stop arm only flash to alert approaching vehicles to stop. Moreover, the frequency and direction of the pulses of light are configured to only meet the low threshold of a conventional stop sign warning light. They do not, though, illuminate the stop sign itself or the roadway around the sign where children are crossing. As a result, current stop arms are not as visible because there is no light directly hitting the reflective surface because all the light is directed away therefrom. As a result, in a dark area or if oncoming headlights are dim or not working the stop sign is not as visible as it should be to oncoming traffic.

As stated above, the current lights on a school bus stop arms only flash in the traditional manner to alert approaching vehicles to stop. They do not illuminate the stop sign itself and the roadway around the sign where children are crossing. In short, the current school bus stop arm relies on light from other sources—e.g., car headlights, streetlights, etc. to light the reflective stop arm.

As can be seen, there is a need for a light assembly adapted to attached to an object and selectively project light onto as well as away from the object, thereby illuminating the assembly, the object it is attached to, and the surrounding area.

The present invention is configured to independently light up the object to which it is attached in addition to projecting light away from the object; in the embodiment where the object is a school bus stop sign arm, the present invention casts light on the reflective surface of the stop sign and/or associated arm, as well as projecting light on the surrounding roadway. The safety light assembly embodied in the present invention increases the overall visible of the object it is associated with, as well as the surrounding environment, as opposed to just making a light visible in a wall of darkness. The safety light assembly directs some of its light rearward toward the object it is attached to by way of a plurality of perimetral lighting elements, which is especially advantageous if the surface surrounding it is reflective, as in a stop sign or vehicle stop sign arm. Accordingly, the present invention does not rely on an extrinsic source of light to illuminate the object to which it is attached.

SUMMARY OF THE INVENTION

In one aspect of the present invention, a safety lighting assembly includes the following: a base portion having a rear surface attached to an object, wherein the base portion has a perimetral edge orthogonal relative to the rear surface; and a plurality of directional lighting units disposed along the perimetral edge, wherein at least one directional lighting unit directs light rays in a base rearward direction toward the object.

In another aspect of the present invention, the safety lighting assembly further includes the following: wherein light rays defined by the base rearward direction defines an angle of incidence relative to an attachment surface of the object, wherein the angle of incident is between thirty and sixty degrees; a body portion removably coupled with a forward surface of the base portion, wherein the body portion emits non-directional light rays; and a head portion removably coupled with a forward surface of the body portion, wherein the head portion emits directional light rays in a selected forward direction.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a safety lighting assembly enabled to cast light rearward toward the surface to which it is attached. The safety light assembly provides additional portions for emitting light in selected directions so as to facilitate situation awareness of the object.

As used herein, and as understood in the art, directional light rays refer to light emission patterns having a distribution of intensity which is substantially concentrated in an angular range significantly smaller than 2 pi steradians (for emission in a half-space) or 4 pi steradians (for emission in a full space). For instance, directional light may include distributions characterized by a beam angle at half-maximum, where the beam angle is no more than 40°. In one embodiment, the beam angle is no more than 30°, and, in a more particular embodiment, no more than 10°. A variety of beam profiles meet this definition-including flat-top beams, Gaussian beams and others.

In some embodiments, the directional lighting unit includes one or more directional light-emitting element configured to emit directional light from the lighting unit. In other embodiments, the directional lighting unit may include at least one light source (including but not limited to LED) for emitting light and being optically coupled to at least one of the at least one directional light-emitting element.

As used herein, non-directional light rays refer to diffuse light, which is well known to those of skill in the art.

Referring now to FIGS. 1 through 9, the present invention may include a safety light assembly 100 adapted to illuminate a surface 10 it is attached to as well as selectively illuminate surrounding area or portions thereof.

Figure 1:
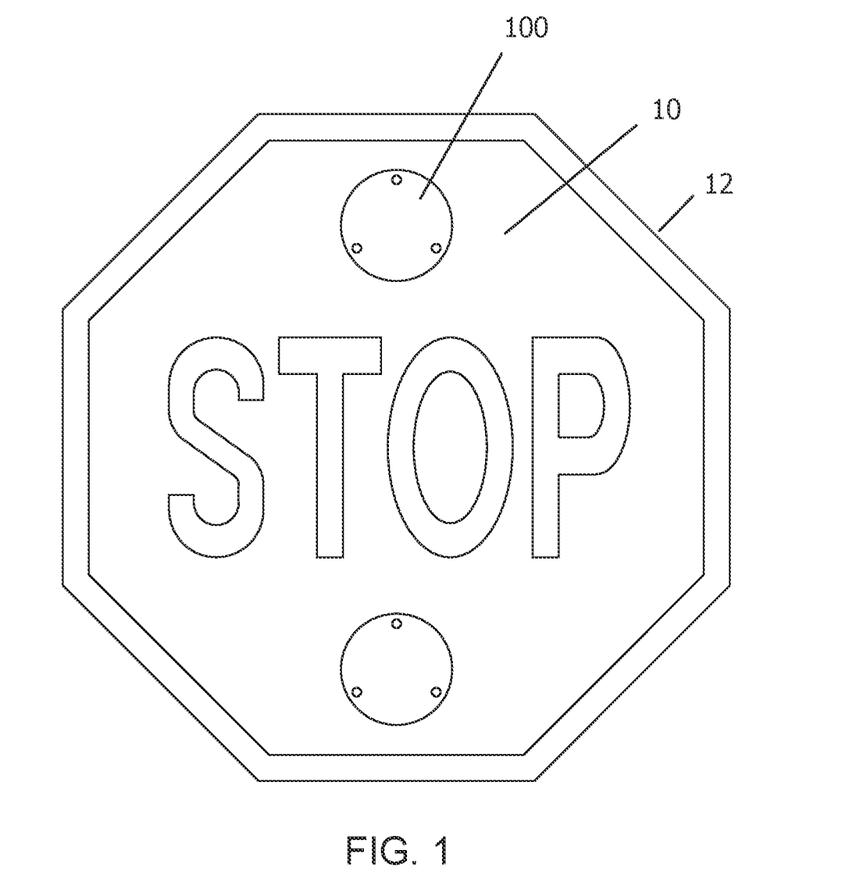
FIG. 1 is a front elevation view of an exemplary embodiment of the present invention.
Figure 2:
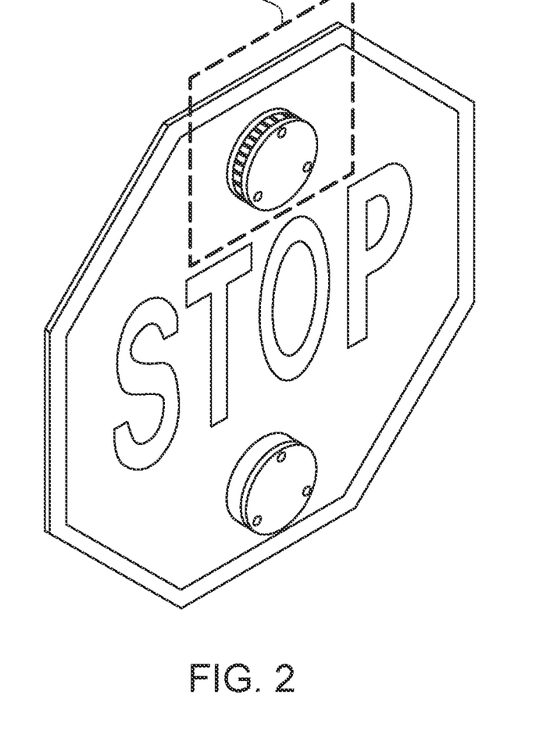
FIG. 2 is a perspective view of an exemplary embodiment of the present invention.
Figure 3:
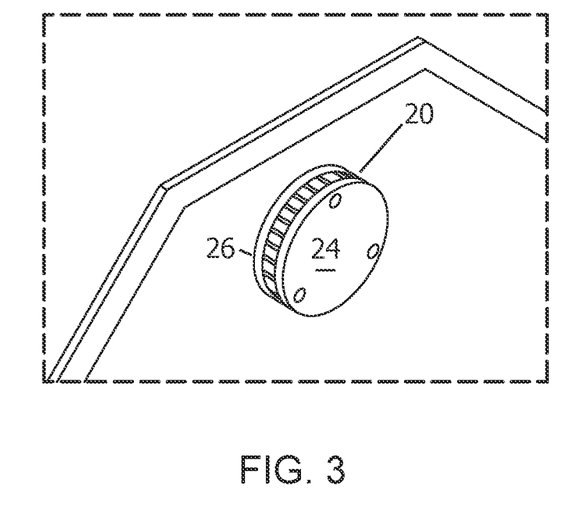
FIG. 3 is a detailed perspective view of an exemplary embodiment of the present invention, indicated by the dashed line in FIG. 2.
Figure 4:
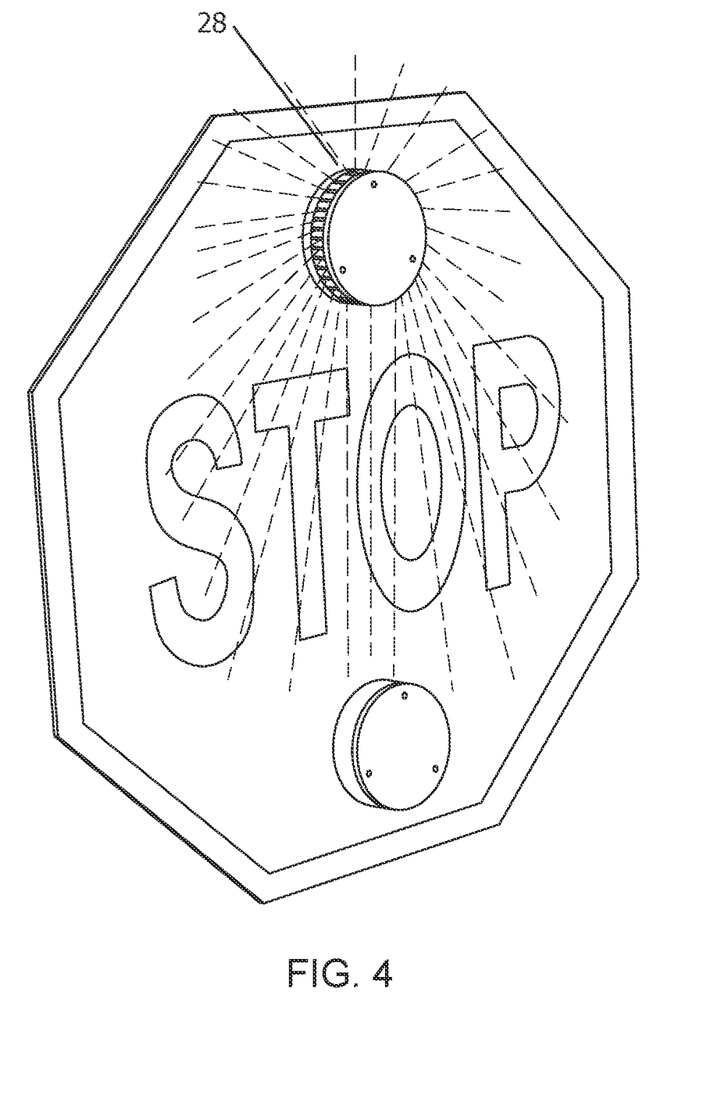
FIG. 4 is a perspective view of an exemplary embodiment of the present invention.
Figure 5:
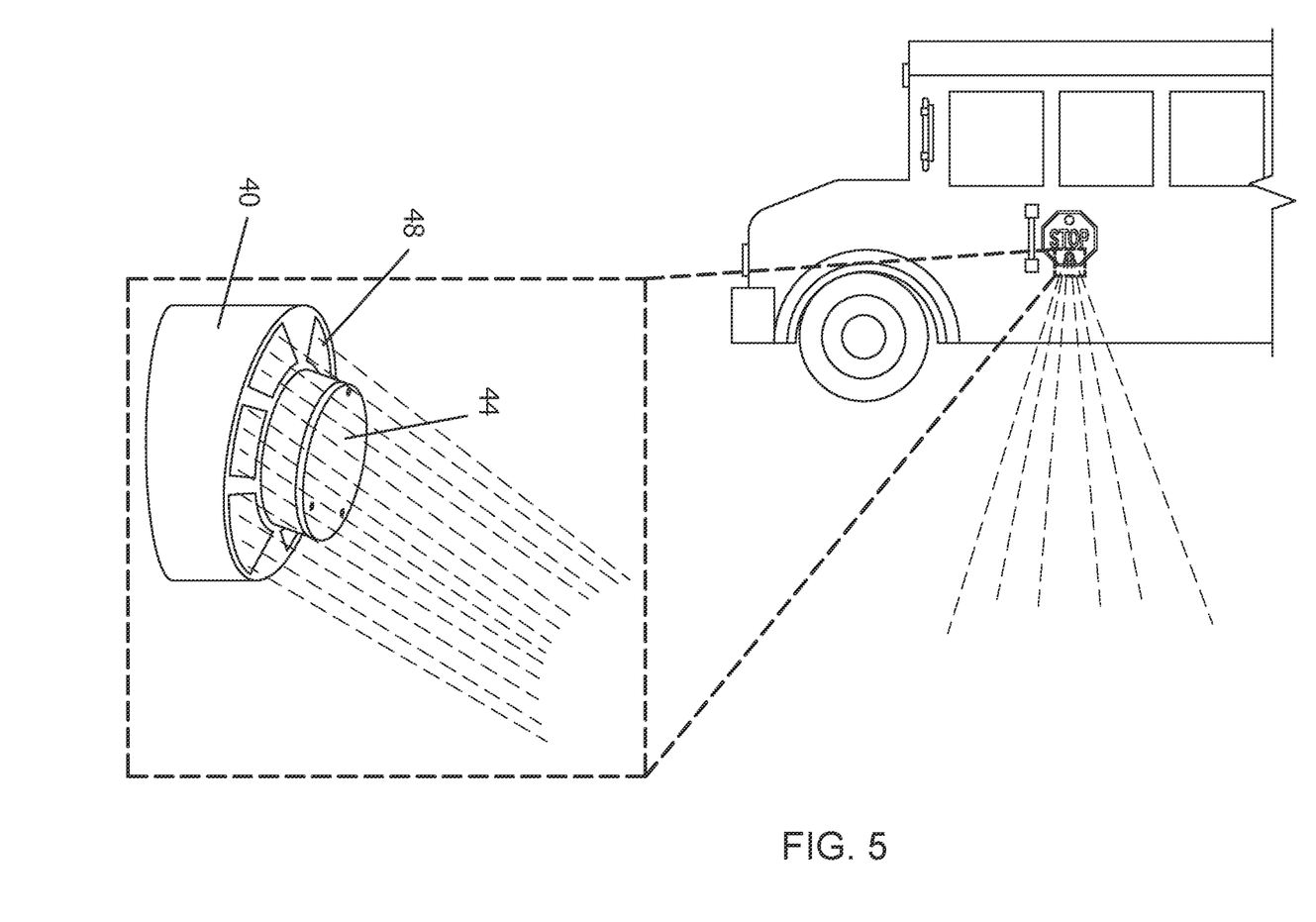
FIG. 5 is a schematic view of an exemplary embodiment of the present invention.
Figure 6:
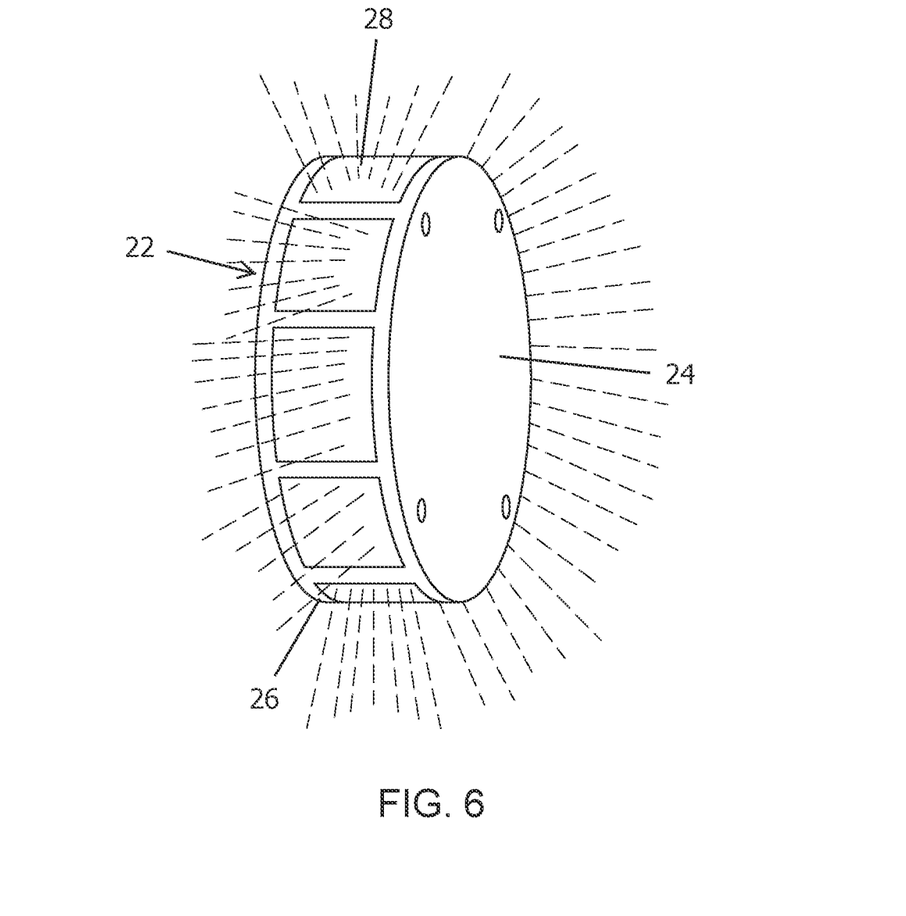
FIG. 6 is a perspective view of an alternative exemplary embodiment of the present invention.

The safety light assembly 100 may have a base portion 20 that connects to the surface 10 of an object 12. The base portion 20 has a rear surface 22 for attachable to said surface 10. The base portion 20 has a forward surface 24 opposite the rear surface 22. The base portion 20 has a perimetral edge 26, between the rear and forward surfaces 22 and 24. The perimetral edge 26 may have a plurality of perimetral lighting elements 28 spaced there along. One or more of the perimetral lighting elements 28 may be a directional light unit. One or more of the perimetral lighting elements 28 directional light units may be directed "rearward" generally in the direction of the rear surface 24, as illustrated in FIG. 6, and thus against the surface 10 to which the safety light assembly 100 is attached. The base portion 20 may have electrical connections 25 for powering the perimetral lighting elements 28 and electrically connected portion of the safety light assembly 100.

Figure 7A:
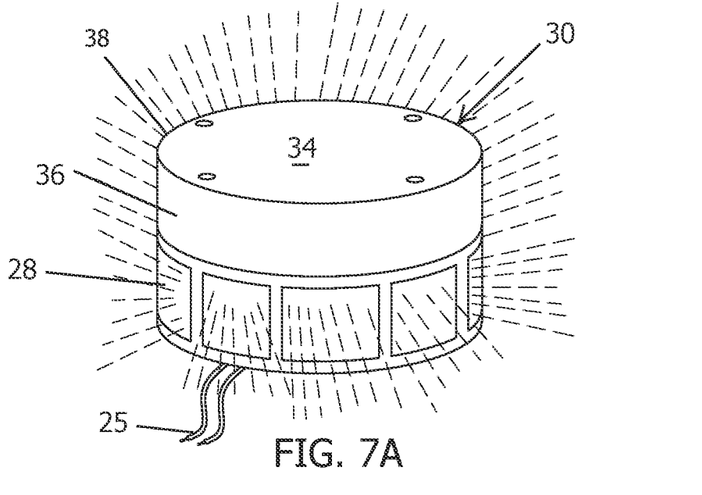
FIG. 7A is a perspective view of an alternative exemplary embodiment of the present invention.
Figure 7B:
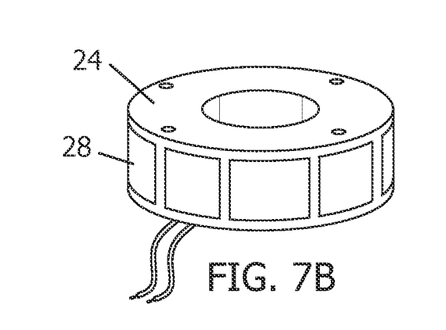
FIG. 7B is a perspective view of an alternative exemplary embodiment of the present invention.
Figure 7C:
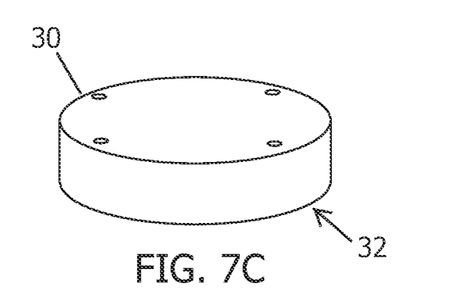
FIG. 7C is a perspective view of an alternative exemplary embodiment of the present invention.
Figure 7D:
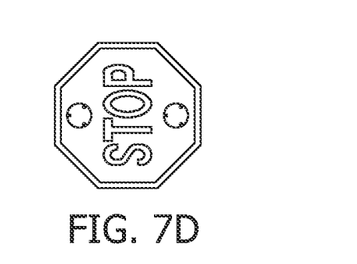
FIG. 7D is a front elevation view of an alternative exemplary embodiment of the present invention.
Figure 8:
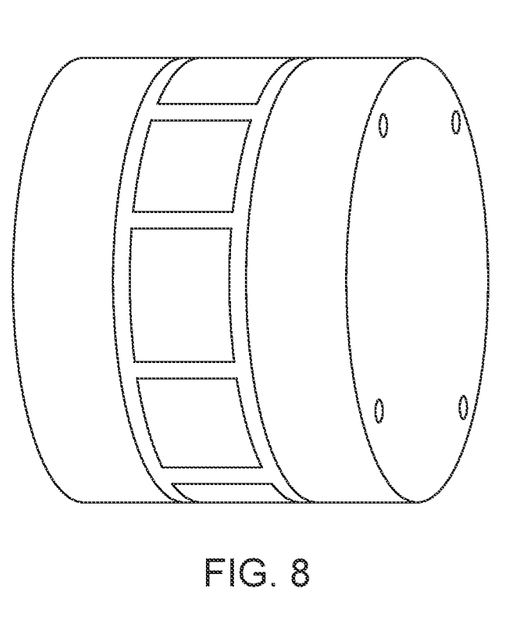
FIG. 8 is a perspective view of an alternative exemplary embodiment of the present invention.
Figure 9:
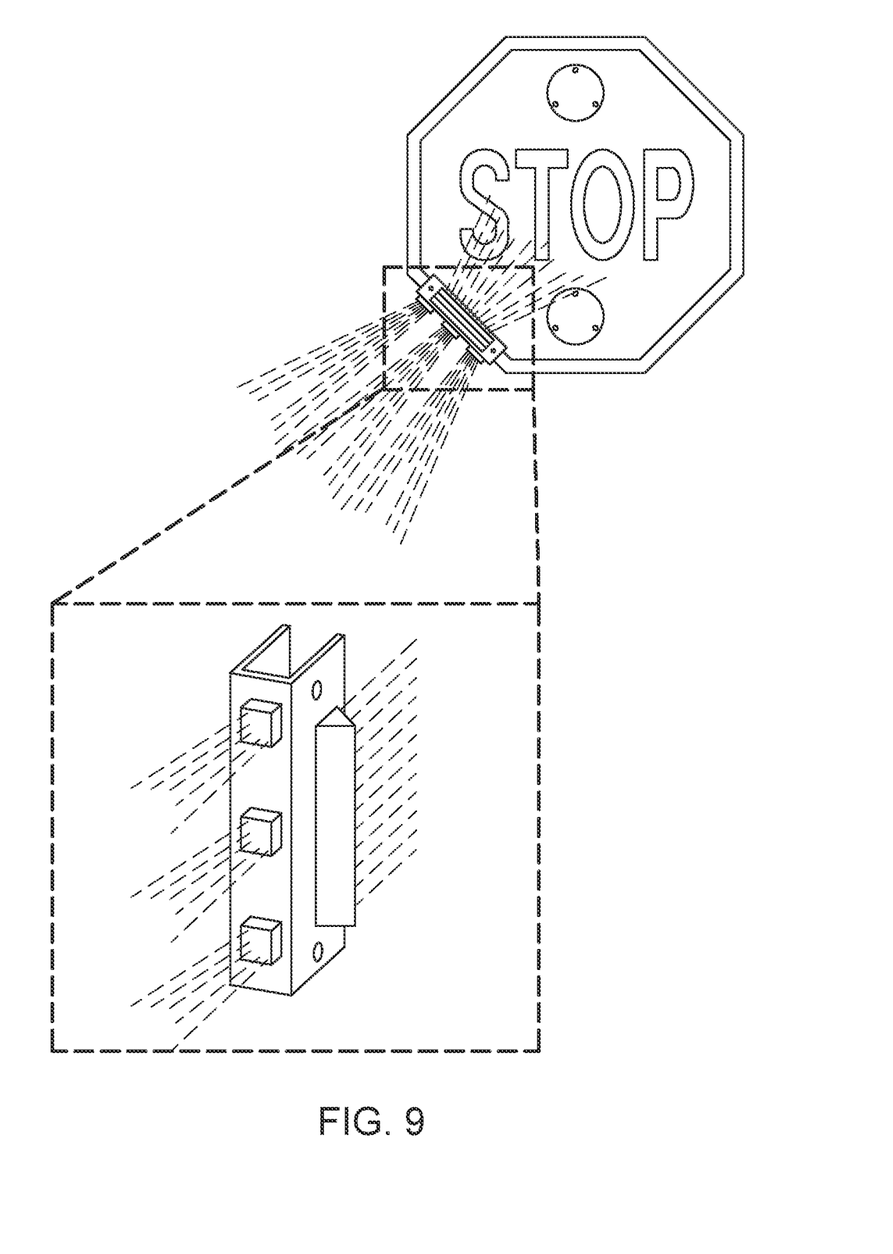
FIG. 9 is a perspective view of an alternative exemplary embodiment of the present invention, including a detailed perspective view of a channel shaped lighting assembly 50 for engaging opposing sides of a flat planar object 12.

The safety light assembly 100 may have a body portion 30 having a rear surface 32 adapted to attach to the forward surface 24 of the base portion 20. This connection may have electrical coupling functionality so that a powered base portion 20 also powers the body portion 30. The body portion 30 may have forward surface 34 opposite its rear surface 32. In some embodiments, the forward surface 34 and perimetral surface 36 of the body portion 30 may form a unitary light-emitting surface 38 that emits light perpendicular to its surface, as illustrated in FIG. 7A. Thus, the perimetral surface 36 directs light orthogonally relative to the light being emitted from the forward surface 34. In one embodiment, the light-emitting surface 38 emits diffuse or non-directional light.

In certain embodiments, a head portion 40 may be attached to the forward surface 24 or 34 of the base or body portions 20 and 30, thereby further coupling an electrical connection of the base portion 20 to the head portion 40. The head portion 40 may have a forward surface 44 including a plurality of directional lighting elements 48 that can be selectively directed independent of each other, or at least in a forward direction away from the surface 10 of the object 12.

It is understood that the light emitted from either the base, body, or head portion of the safety light assembly 100 may be a flashing light, a pulse light, a light of one of many different colors, etc.

In embodiments where the object 12 is a school bus stop arm, the safety light assembly 100 may be selectively activated so that one or more of the plurality of perimetral lighting elements 28 cast light rearward on the reflective surface of the school bus stop arm, while the light-emitting surface 38 projects light from all visible surfaces, and wherein certain embodiments, the directional lighting elements 48 are directed downward toward the ground adjacent the school bus stop arm. Alternatively, since the directional lighting elements 48 may be selectively controlled, they may project light at surrounding objects or even upward/skyward.

The different portions 20, 30, and 40 could take on different shapes than those shown in the attached figures, including but not limited to cubic, pyramidic, etc., so that light shines from different areas and at different angles as desired.

A method of using the present invention may include the following. The safety light assembly 100 disclosed above may be provided. A user may place at least the base portion 20 in the desired location along the surface 10 and connect it to the power source by way of the electrical connections 25. It should be understood that the safety light assembly 100 could be used on delivery trucks or any other vehicle that frequently stops on the roadway. Placed in the right location of any vehicle the safety light assembly 100 can send out a warning to oncoming traffic that there is pedestrian activity around the vehicle, and it can also illuminate the area/roadway where the activity is taking place, which could be several yards from the vehicle because of the selectivity of the directional lighting elements 48.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A safety lighting assembly, comprising:
   a base portion having a rear surface attached to an object, wherein the base portion has a perimetral edge orthogonal relative to the rear surface;
   a plurality of directional lighting units disposed along the perimetral edge, wherein at least one directional lighting unit directs light rays in a base rearward direction toward the object; and
   a body portion removably coupled with a forward surface of the base portion, wherein the body portion emits non-directional light rays.

2. The safety lighting assembly of claim 1, wherein light rays defined by the base rearward direction defines an angle of incidence relative to an attachment surface of the object, wherein the angle of incident is between thirty and sixty degrees.

3. The safety lighting assembly of claim 1, further comprising a head portion removably coupled with a forward surface of the body portion, wherein the head portion emits directional light rays in a selected forward direction.

4. A method of increasing the visibility of a light-reflective surface, the method comprising:
   attaching a safety lighting assembly on the light-reflective surface, wherein the safety lighting assembly comprises:
   a base portion having a rear surface attached to the light-reflective surface, wherein the base portion has a perimetral edge orthogonal relative to the rear surface;
   a plurality of directional lighting units disposed along the perimetral edge, wherein at least one directional lighting unit directs light rays in a base rearward direction against the light-reflective surface, wherein light rays defined by the base rearward direction defines an angle of incidence relative to an attachment surface of the object, wherein the angle of incident is between thirty and sixty degrees; and
   a body portion removably coupled with a forward surface of the base portion, wherein the body portion emits non-directional light rays.

\* \* \* \* \*